United States Patent
Hellwig

(10) Patent No.: US 10,110,367 B2
(45) Date of Patent: Oct. 23, 2018

(54) HIGH PRECISION TIMER IN CPU CLUSTER

(71) Applicant: Emerson Network Power—Embedded Computing, Inc., Tempe, AZ (US)

(72) Inventor: Mathias Hellwig, Eichenau (DE)

(73) Assignee: Artesyn Embedded Computing, Inc., Tempe, AZ (US)

( * ) Notice: Subject to any disclaimer, the term of this patent is extended or adjusted under 35 U.S.C. 154(b) by 427 days.

(21) Appl. No.: 13/799,167

(22) Filed: Mar. 13, 2013

(65) Prior Publication Data

US 2014/0056319 A1    Feb. 27, 2014

Related U.S. Application Data

(60) Provisional application No. 61/691,460, filed on Aug. 21, 2012.

(51) Int. Cl.
*H04L 7/00* (2006.01)
*H04J 3/06* (2006.01)

(52) U.S. Cl.
CPC .............. *H04L 7/00* (2013.01); *H04J 3/0697* (2013.01); *H04J 3/0667* (2013.01); *H04J 3/0688* (2013.01)

(58) Field of Classification Search
CPC ...... H04J 3/0697; H04J 3/0688; H04J 3/0667; H04L 7/00
See application file for complete search history.

(56) References Cited

U.S. PATENT DOCUMENTS

| | | | |
|---|---|---|---|
| 2005/0125152 A1* | 6/2005 | Fuchs | G01S 5/0036 701/469 |
| 2007/0281643 A1* | 12/2007 | Kawai | 455/185.1 |
| 2009/0147903 A1 | 6/2009 | Kikuchi et al. | |
| 2009/0180478 A1* | 7/2009 | Yu et al. | 370/395.1 |
| 2009/0286564 A1* | 11/2009 | Ho | 455/502 |
| 2010/0001770 A1* | 1/2010 | Bogenberger et al. | 327/144 |
| 2010/0115295 A1* | 5/2010 | Diab | 713/300 |

(Continued)

FOREIGN PATENT DOCUMENTS

| | | |
|---|---|---|
| CN | 101075475 A | 11/2007 |
| CN | 101459504 A | 6/2009 |
| CN | 101960770 A | 1/2011 |

OTHER PUBLICATIONS

ITU-T G.8261/Y.1361. ITU-T Telecommunication Standardization Sector of ITU, "Series G: Transmissions Systems and Media, Digital Systems and Networks," Apr. 2008.

(Continued)

*Primary Examiner* — Walter J Divito
*Assistant Examiner* — Anthony Luo
(74) *Attorney, Agent, or Firm* — Harness, Dickey & Pierce, P.L.C.

(57) ABSTRACT

A system includes a first node that generates a first clock signal having a frequency, generates a plurality of data packets, modifies the data packets to include data indicative of time and phase information associated with the first node, and transmits the data packets. A second node receives the plurality of data packets and the first clock signal, determines the time and phase information based on the plurality of data packets, determines the frequency based on the first clock signal, and generates at least one of a second clock signal and a local time based on the time and phase information and the frequency of the first clock signal.

24 Claims, 5 Drawing Sheets

(56) References Cited

U.S. PATENT DOCUMENTS

| | | | | |
|---|---|---|---|---|
| 2010/0311424 | A1* | 12/2010 | Oga .............................. | 455/440 |
| 2011/0006818 | A1* | 1/2011 | Takagi et al. ................. | 327/147 |
| 2011/0267985 | A1* | 11/2011 | Wilkinson .......... | H04M 1/2535 370/259 |
| 2012/0087421 | A1* | 4/2012 | Six et al. ...................... | 375/259 |
| 2012/0105637 | A1* | 5/2012 | Yousefi et al. ................ | 348/148 |
| 2012/0284101 | A1* | 11/2012 | Schiller ................. | G06Q 30/02 705/14.23 |
| 2013/0291044 | A1* | 10/2013 | Zinevich .......... | H04N 21/44209 725/111 |

OTHER PUBLICATIONS

IEEE Power and Energy Society: IEEE Std C37.238-2011 "IEEE Standard Profile for Use of IEEE 1588 Precision Time Protocol in Power System Applications," Jul. 14, 2011.

English translation of the Chinese Office Action for Application No. 201310361969.7 dated May 4, 2016.

English translation of Chinese Office Action for Application No. 201310361969.7, dated Dec. 14, 2016.

English Translation of Chinese Office Action for Application No. 201310361969.7 dated Jun. 28, 2017.

* cited by examiner

HIGH PRECISION TIMER IN CPU CLUSTER

CROSS-REFERENCE TO RELATED APPLICATIONS

This application claims the benefit of U.S. Provisional Application No. 61/691,460, filed on Aug. 21, 2012. The entire disclosure of the above application is incorporated herein by reference.

FIELD

The present disclosure relates to clock timing in a CPU cluster.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A plurality of nodes may be interconnected in a system. For example, each node may include one or more processors and other components including, but not limited to, volatile and non-volatile memory, application specific hardware, such as application specific integrated circuits (ASICs), and various communication interfaces. For example only, the ASICs and communication interfaces may include telecommunication, military, industrial automation, and/or global positioning system (GPS) devices and interfaces. Each node may include one or more printed circuit boards (PCBs) arranged in a card or board configuration.

The nodes may be interconnected in a CPU cluster system such as a chassis configured to enclose a backplane and a plurality of nodes. For example, each node may include one or more plug or socket type edge connectors (i.e., connectors arranged on an edge of a card or board). The backplane may include a plurality of complementary socket or plug type backplane connectors configured to receive the edge connectors of the nodes. The nodes are inserted into the chassis and the backplane connectors receive respective ones of the edge connectors. Example implementations of CPU cluster systems include, but are not limited to, Advanced Telecommunications Computing Architecture (ATCA) systems, Compact Peripheral Component Interconnect (CPCI) systems, and VPX systems. Other suitable connection types may be used.

The nodes communicate with one another via the backplane. For example, the backplane may include one or more data buses. Or, the nodes may communicate directly with each other via point-to-point connections through the backplane. The nodes may communicate data (e.g., packet based data), timing information (e.g., clock signals), or any other information via the backplane.

SUMMARY

A system includes a first node that generates a first clock signal having a frequency, generates a plurality of data packets, modifies the data packets to include data indicative of time and phase information associated with the first node, and transmits the data packets. A second node receives the plurality of data packets and the first clock signal, determines the time and phase information based on the plurality of data packets, determines the frequency based on the first clock signal, and generates at least one of a second clock signal and a local time based on the time and phase information and the frequency of the first clock signal.

A method includes, at a first node, generating a first clock signal having a frequency, generating a plurality of data packets, modifying the data packets to include data indicative of time and phase information associated with the first node, and transmitting the data packets. The method includes, at a second node, receiving the plurality of data packets and the first clock signal, determining the time and phase information based on the plurality of data packets, determining the frequency based on the first clock signal, and generating at least one of a second clock signal and a local time based on the time and phase information and the frequency of the first clock signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

In a node cluster (such as a CPU cluster system), a plurality of nodes may execute one or more distributed applications. In other words, each of the nodes in the node cluster may provide the same or different processing functions for a given application or task for the application. For example only, the nodes may operate in series or in parallel on respective tasks associated with the application.

The application may rely on a common time base across the plurality of nodes. In other words, each node may attempt to synchronize with other ones of the nodes according to a desired time, phase, and frequency. Proper synchronization between the plurality of nodes increases an overall accuracy of the node cluster. Accordingly, applications that depend on an accurate time may be distributed across nodes.

For example, the node cluster may implement a packet-based timing scheme to determine time and phase. In the packet-based timing scheme, data packets that are transmitted between the nodes may include timestamps or other data indicative of time and phase. For example only, a master node may distribute data packets including the timestamps to a plurality of slave nodes. Further, each of the slave nodes may include a respective node oscillator associated with the timing of the node. The nodes may determine the time and phase based on the information included in the data packets. Conversely, the nodes may estimate frequency using the information included in the data packets and generate, using the node oscillator, a node clock signal according to the estimated frequency.

The estimated frequency does not accurately correspond to a frequency associated with the master node. For example, the master node may operate according to a master clock signal and an associated oscillator. The node oscillators may have a time-variable offset (e.g., due to oscillator drift) with respect to the frequency of the master clock signal. In a node cluster according to the present disclosure, the slave nodes generate the respective node clock signals according to the master clock signal or another clock signal that is distributed to each of the slave nodes. Accordingly, each slave node may still independently determine the time and phase information in a packet-based or other timing scheme, but lock the node clock signal to a system-wide clock signal.

Figure 1:
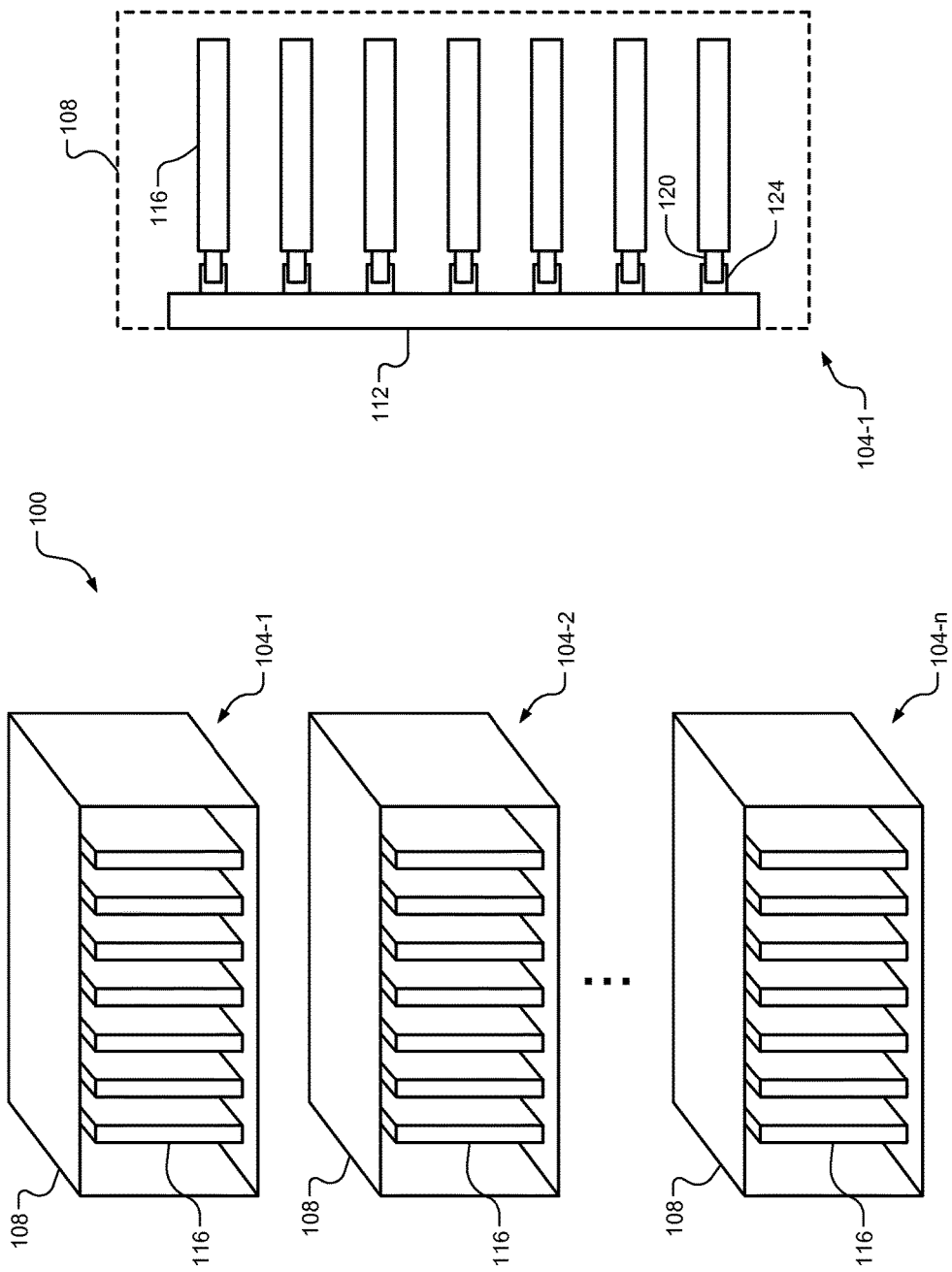
FIG. 1A illustrates a network including a plurality of node clusters according to the principles of the present disclosure.
FIG. 1B illustrates a node cluster according to the principles of the present disclosure.

Referring now to FIGS. 1A and 1B, a network 100 may include a plurality of node clusters 104-1, 104-2, . . . , 104-n, referred to collectively as node clusters 104. For example only, the network 100 may correspond to a CPU cluster system that includes, but is not limited to, an Advanced Telecommunications Computing Architecture (ATCA) system, a Compact Peripheral Component Interconnect (CPCI) system, and a VPX system. Each of the node clusters 104 includes structure such as a chassis 108 (e.g., chassis 108-1, 108-2, . . . , 108-n, referred to collectively as chassis 108). Each of the chassis 108 includes a backplane 112 that receives a plurality of nodes 116. For example only, each of the nodes 116 includes one or more edge connectors 120 on an edge of a card or board that connect to respective backplane connectors 124 of the backplane 112. The nodes 116 in any given one of the node clusters 104 may generate respective node clock signals according to a system-wide clock signal distributed by the backplane 112 and/or another one of the nodes 116.

Figure 2:
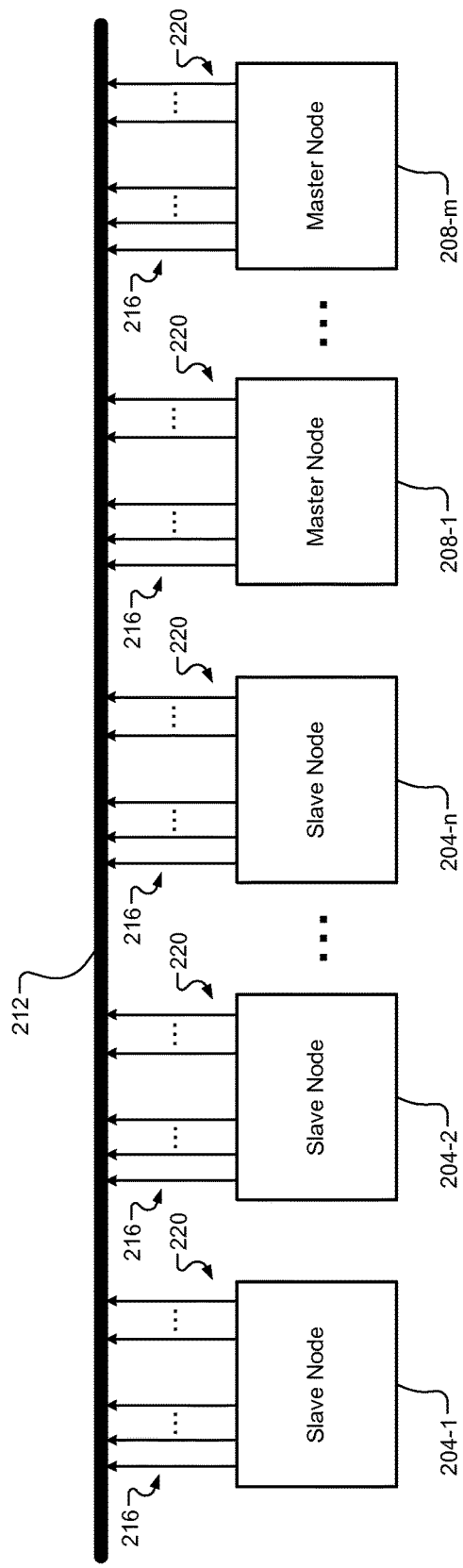
FIG. 2 is a functional block diagram of a node cluster according to the principles of the present disclosure.

Referring now to FIG. 2, an example node cluster 200, shown schematically, includes a plurality of slave nodes 204-1, 204-2, . . . , and 204-n, referred to collectively as slave nodes 204, and one or more master nodes 208-1, . . . , 208-m, referred to collectively as master nodes 208. Each of the slave nodes 204 and the master nodes 208 communicate with a backplane 212. For example, the nodes 204 and 208 transmit and/or receive data (e.g., data packets) using one or more data signals 216. The nodes 204 and 208 may also transmit and/or receive one or more clock signals 220. The nodes 204 and 208 synchronize processing based on the data signals 216 and the clock signals 220. For example, each of the slave nodes 204 may operate according to the same time, phase, and frequency. The slave nodes 204 may implement a packet-based timing scheme to determine the time and the phase based on data packets received from one of the master nodes 208 via the data signals 216. Conversely, each of the slave nodes 204 determine the frequency based on the clock signal 220 generated by one of the master nodes 208. Further, although the nodes 204 and 208 are shown connected via the backplane 212, other connection structures and/or interfaces may be used. For example, the nodes 208 may merely be wired together using any suitable connection interface (e.g., wires, cables, etc.) for transmitting clocks and data to the nodes in parallel.

In some implementations, the slave nodes 204 may select between two of the master nodes 208. For example, the slave nodes 204 may select a first one of the master nodes 208 to operate according to the time, phase, and frequency of the first one of the master nodes 208. Or, the slave nodes 204 may select a second one of the master nodes 208 to operate according to the time, phase, and frequency of the second one of the master nodes 208.

Figure 3:
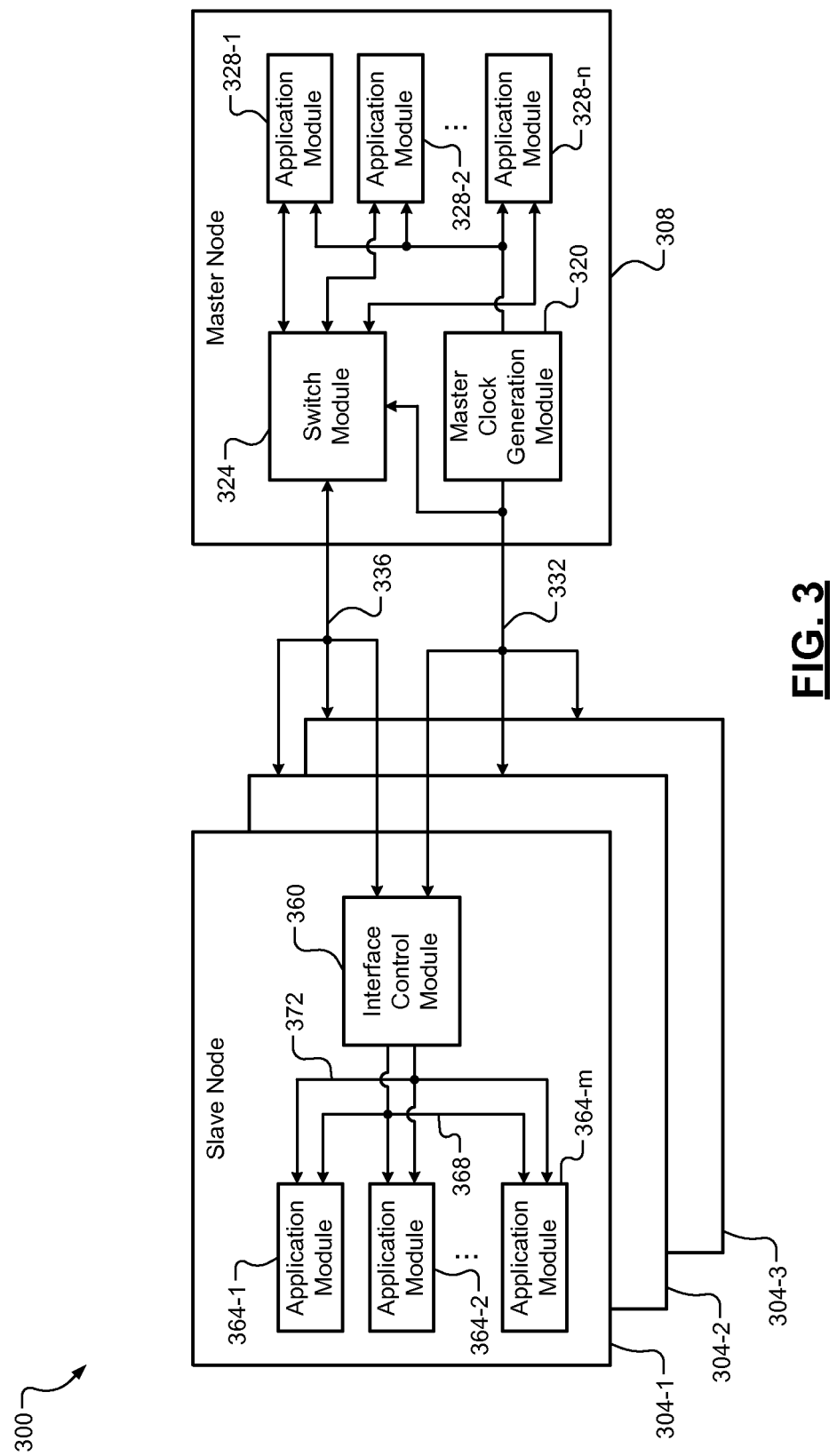
FIG. 3. is a functional block diagram of a master node and a plurality of slave nodes according to the principles of the present disclosure.

Referring now to FIG. 3, a node cluster 300 includes slave nodes 304-1, 304-2, and 304-3, referred to collectively as slave nodes 304, and a master node 308. Although only the master node 308 is shown for illustrative purposes, it can be appreciated that the node cluster 300 may include a plurality of the master nodes 308 each configured to communicate with the slave nodes 304. Further, the node cluster 300 may include any number of the slave nodes 304.

The master node 308 includes a master clock generation module 320, a switch module 324, and application modules 328-1, 328-2, . . . , and 328-n, referred to collectively as application modules 328. The application modules 328 perform processing and/or other tasks associated with the operation of the node cluster 300. For example only, the application modules 328 may include one or more processors and or application specific integrated circuits (ASICs) that perform telecommunication, military, industrial automation, and/or global positioning system (GPS) related processing tasks. The application modules 328 may correspond to any application that operates across a plurality of nodes and uses a common time base.

The master clock generation module 320 generates a master clock signal 332. The master clock signal 332 is distributed to each of the slave nodes 308. The master clock signal 332 may also be distributed to the application modules 328. Accordingly, the master clock signal 332 may be a common or system wide clock that functions as a common time base for the node cluster 300. For example, master clock generation module 320 generates the master clock signal 332 having a predetermined frequency. Although as shown the master clock generation module 320 provides the master clock signal 332 directly to the slave nodes 304, it can be appreciated that the master clock signal 332 may be distributed via structure such as the backplane 212 as shown in FIG. 2 or any other suitable connection interface (e.g., distributed to nodes in remote shelves via wires or cables).

The switch module 324 transmits data (e.g., data packets) to the slave nodes 304 and receives data from the slave nodes 304 via data signals 336. Similarly, the switch module 324 may exchange data packets with the application modules 328. The switch module 324 may include any suitable data switch, such as an Ethernet switch. For example only, the switch module 324 includes an Ethernet switch that operates according to a precision time protocol (PTP) such as IEEE 1588 and/or a network time protocol (NTP). Although as shown the switch module 324 provides the data signals 336 directly to the slave nodes 304, it can be appreciated that the data signals 336 may be distributed via structure such as the backplane 212 as shown in FIG. 2. Further, although the switch module 324 is shown integrated with the master node 308, the switch module 324 could be located external to the master node 308.

The switch module 324 modifies each data packet transmitted to the slave nodes 304 to include data indicative of time and phase information associated with operation of the master node 308. For example, the switch module 324 may modify each data packet to include a timestamp indicating a corresponding transmission time of the data packet. Accordingly, the timestamps for a plurality of the data packets transmitted to the slave nodes 304 are indicative of both time and phase information associated with the operation of the node cluster 300.

Each of the slave nodes 304 includes an interface control module 360 and application modules 364-1, 364-2, . . . , and 364-*m*, referred to collectively as application modules 364. Similar to the application modules 328 of the master node 308, the application modules 364 perform processing and/or other tasks associated with the operation of the node cluster 300. For example only, the application modules 364 may include one or more processors and or ASICs, and may correspond to any application that operates across a plurality of nodes and uses a common time base. The application modules 364 may execute a plurality of respective software sets to perform the tasks.

The interface control module 360 receives the master clock signal 332 and the data signals 336 (i.e., the data packets) from the master node 308. The interface control module 360 may implement an input/output (I/O) controller hub (ICH) or any other suitable interface controller. The interface control module 360 determines the time and phase information using the timestamps of the data packets received from the master node 308. The interface control module 360 uses the time and phase information and the frequency of the master clock signal 332 to generate a slave clock signal 368. The interface control module 360 distributes the slave clock signal 368 to the application modules 364, which may distribute a local time based on the slave clock signal 368 to respective software applications. Or, the interface control module 360 may distribute a local time to the application modules that is based on the time and phase information and the frequency. Accordingly, the slave clock signal 368 (or a local time) is generated according to the time, phase, and frequency of the master node 308. The interface control module 360 may also exchange data packets with the application modules 364 via data signals 372.

Figure 4:
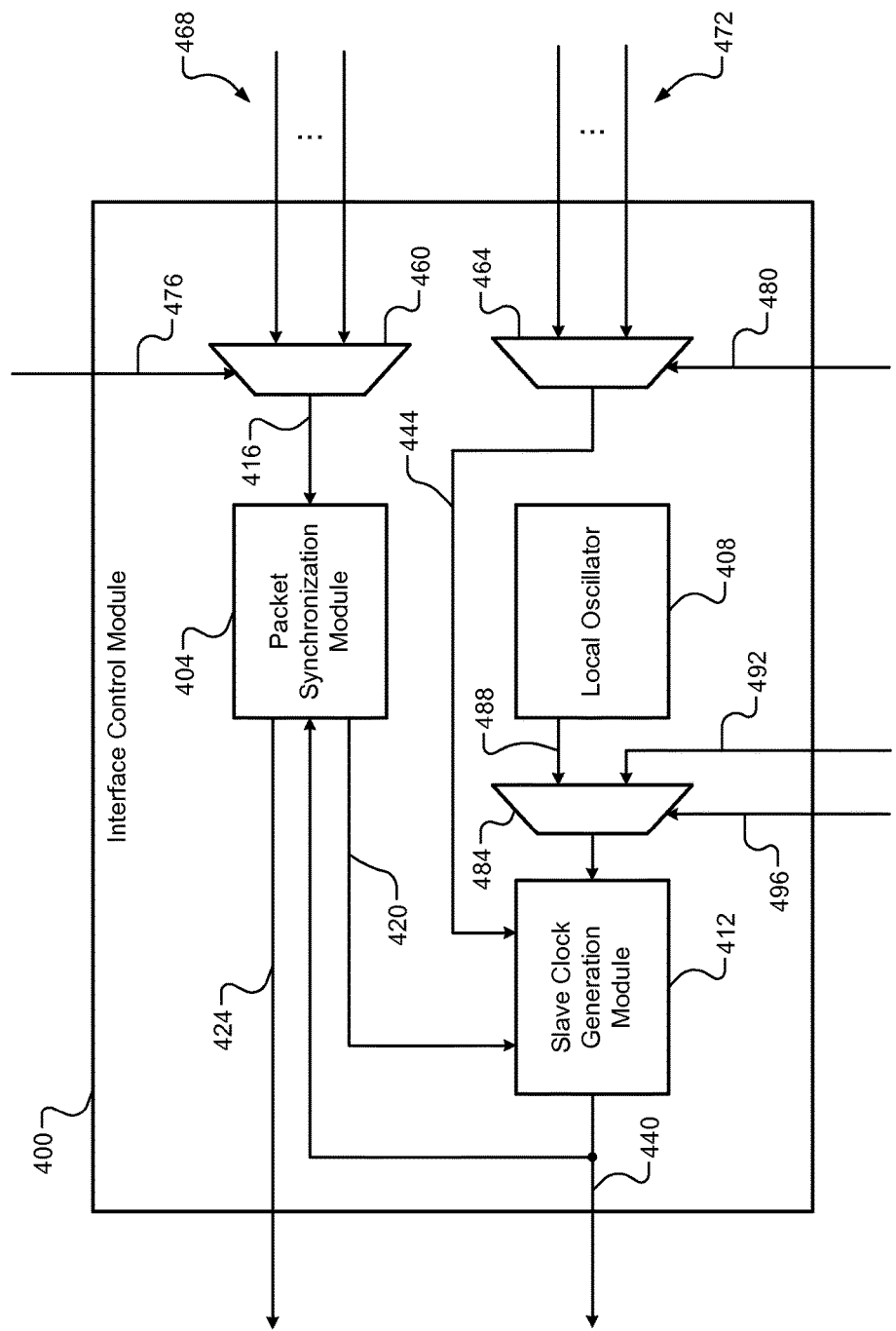
FIG. 4 is a functional block diagram of an interface control module according to the principles of the present disclosure.

Referring now to FIG. 4, an example interface control module 400 includes a packet synchronization module 404, a local oscillator 408, and a slave clock generation module 412. The packet synchronization module 404 determines time and phase information associated with data packets received from a master node (e.g., via data signals 416 based on timestamps included in each of the data packets. For example, the packet synchronization module 404 may recover time and phase signals 420 based on the timestamps according to IEEE 1588 PTP, the International Telecommunication Union (ITU-T) Recommendation G.8261/Y.1361 (which is incorporated herein by reference), or another suitable packet-based timing scheme. For example only, the packet synchronization module 404 may implement a high precision counter (HPC) and/or an IEEE 1588 compatible counter to enable the packet-based timing scheme. The packet synchronization module 404 provides the time and phase signals 420 to the slave clock generation module 412. The packet synchronization module 404 may also output the data packets via data signals 424.

In a typical packet-based timing scheme, an estimated frequency (e.g., a frequency associated with the master node) may be calculated based on the recovered time and phase information. For example, the estimated frequency may be calculated based on an estimated round trip delay associated with communication of data packets to and from the master node and an estimated time-variable offset (e.g., due to oscillator drift attributed to the local oscillator 408).

Conversely, the interface control module 400 does not calculate an estimated frequency. Instead, the packet synchronization module 404 provides the time and phase signals 420 to the slave clock generation module 412, and the slave clock generation module 412 generates a slave clock signal 440 based on the time and phase signals 420 and a master clock signal 444 received from the master node. Specifically, the slave clock generation module 412 determines the frequency of the master clock signal 444 and generates the slave clock signal 440 according to the time and phase signals 420 and the frequency of the master clock signal 444. For example, the slave clock generation module 412 may lock the slave clock signal 440 to the master clock signal using the time and phase signals 420 and the frequency of the master clock signal 444. For example only, the slave clock generation module 412 may implement a phase locked loop (PLL) to lock the slave clock signal 440 to the master clock signal 444. The slave clock generation module 412 may communicate with the local oscillator 408 to monitor the master clock signal 444. The slave clock generation module 412 distributes the slave clock signal 440 to the application modules 364 (as shown in FIG. 3), and may provide the slave clock signal 440 to the packet synchronization module 404.

In some implementations, a node cluster may include more than one master node. For example, the node cluster may include more than one master node for redundancy or to provide additional functionality. Accordingly, the interface control module 400 may select between information received from the plurality of master nodes. For example only, the interface control module 400 may include switches 460 and 464 to select between data signals 468 and master clock signals 472, respectively. The switch 460 may output a selected one of the data signals 468 according to a select signal 476. Conversely, the switch 464 may output a selected one of the master clock signals 472 according to a select signal 480. For example only, any of the slave nodes, the master nodes, or any other structure associated with the node cluster may generate the select signals 476 and 480.

Similarly, the interface control module 400 may include a switch 484 for selecting between a local oscillator signal 488 and an external oscillator signal 492 based on a select signal 496. For example, another slave node, a backplane of the node cluster, or any other structure associated with the node cluster may generate the external oscillator signal 492.

Figure 5:
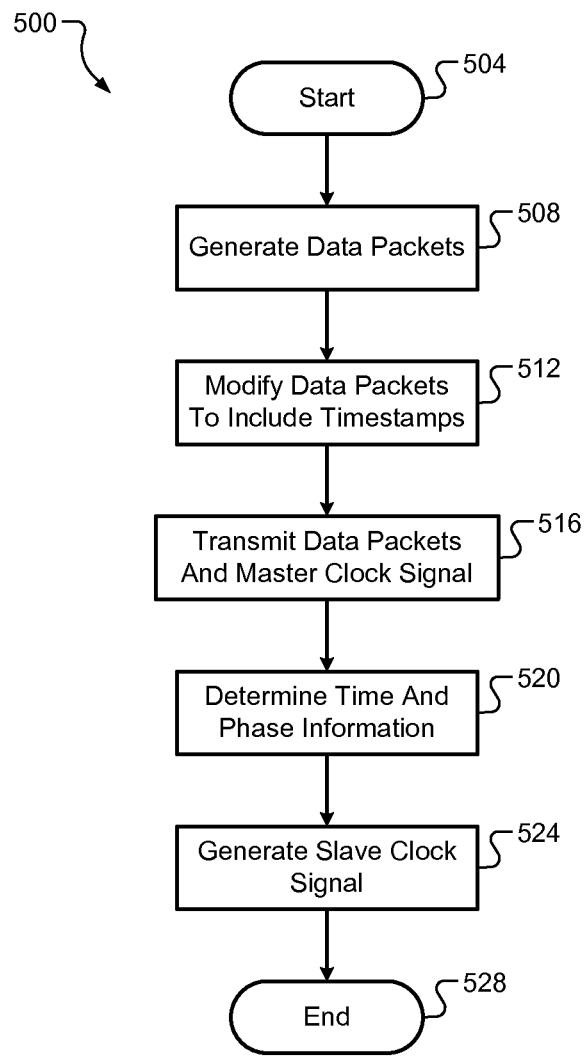
FIG. 5 illustrates a method of operating a node cluster according to the principles of the present disclosure.

Referring now to FIG. 5, a method 500 of operating a node cluster begins at 504. At 508, the method 500 generates data packets for transmission to one or more slave nodes. At 512, the method 500 modifies the data packets to include corresponding timestamps. At 516, the method 500 transmits the data packets including the timestamps and a master clock signal to the slave nodes. At 520, the method 500 determines time and phase information using the timestamps according to a packet-based timing scheme. At 524, the method 500 generates a slave clock signal based on the time and phase information and a frequency of the master clock signal. The method 500 ends at 528.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system, comprising:
    a first node connected to a backplane that generates a first clock waveform having a frequency, generates a plurality of data packets, modifies the data packets to include data indicative of time and phase information associated with the first node, and transmits the first clock waveform and the data packets; and
    a second node connected to the backplane that receives the plurality of data packets and the first clock waveform, obtains the time and phase information included in the plurality of data packets, and generates at least one of a second clock waveform and a local time based on the time and phase information and the frequency of the first clock waveform.

2. The system of claim 1, wherein the data indicative of time and phase information includes at least one timestamp.

3. The system of claim 1, wherein the first node is a master node and the second node is a slave node.

4. The system of claim 1, wherein the first node includes a switch module that modifies the data packets to include the data indicative of time and phase information and transmits the data packets.

5. The system of claim 4, wherein the switch module includes an Ethernet switch that operates according to Institute of Electrical and Electronics Engineers (IEEE) 1588 protocol.

6. The system of claim 1, wherein the second node includes a packet synchronization module that determines the time and phase information.

7. The system of claim 6, wherein the packet synchronization module determines the time and phase information using a packet-based timing scheme according to Institute of Electrical and Electronics Engineers (IEEE) 1588 protocol.

8. The system of claim 1, wherein the second node includes a slave clock generation module that generates the at least one of the second clock waveform and the local time based on the time and phase information and the frequency of the first clock waveform.

9. The system of claim 8, wherein the slave clock generation module implements a phase locked loop that locks the second clock waveform to the first clock waveform using the time and phase information and the frequency of the first clock waveform.

10. The system of claim 1, further comprising a third node connected to the backplane that generates a third clock waveform, wherein:
    the first node and the third node are master nodes;
    the second node is a slave node; and
    the second node selects between the first clock waveform and the third clock waveform.

11. A method, comprising:
    at a first node connected to the backplane,
    generating a first clock waveform having a frequency;
    generating a plurality of data packets;
    modifying the data packets to include data, where the data defines time and phase information associated with the first node; and
    transmitting the first clock waveform and the data packets; and
    at a second node connected to the backplane,
    receiving the plurality of data packets and the first clock waveform;
    obtaining from the data packets the time and phase information included in the plurality of data packets;
    determining the frequency based on the first clock waveform; and
    generating at least one of a second clock waveform and a local time based on the time and phase information and the frequency of the first clock waveform.

12. The method of claim 11, wherein the data indicative of time and phase information includes at least one timestamp.

13. The method of claim 11, wherein the first node is a master node and the second node is a slave node.

14. The method of claim 11, wherein modifying the data packets to include the data indicative of time and phase information includes modifying the data packets according to Institute of Electrical and Electronics Engineers (IEEE) 1588 protocol.

15. The method of claim 11, wherein determining the time and phase information includes determining the time and phase information using a packet-based timing scheme according to Electrical and Electronics Engineers (IEEE) 1588 protocol.

16. The method of claim 11, further comprising implementing a phase locked loop to lock the second clock waveform to the first clock waveform using the time and phase information and the frequency of the first clock waveform.

17. The method of claim 11, further comprising:
    at a third node connected to the backplane, generating a third clock waveform, wherein the first node and the third node are master nodes and the second node is a slave node; and
    at the second node, selecting between the first clock waveform and the third clock waveform.

18. A system, comprising:
    a first node connected to the backplane including:
    a master clock generator generating a first clock waveform having a frequency; and
    a switch module, the switch module generates a plurality of data packets, modifies the data packets to include data indicative of time and phase information associated with the first node, and transmits the first clock waveform and data packets; and a second node connected to the backplane including:
- a packet synchronization module, the packet synchronization module receives the plurality of data packets and the first clock waveform and obtains the time and phase information from the plurality of the data packets; and
- a slave clock generation module receiving the time and phase information communicated by the packet synchronization module, the slave clock generation module generating at least one of a second clock waveform and a local time based on the time and phase information and the frequency of the first clock waveform.

19. The system of claim 18, wherein the data indicative of time and phase information includes at least one timestamp.

20. The system of claim 18, wherein the first node is a master node and the second node is a slave node.

21. The system of claim 18, wherein the switch module includes an Ethernet switch that operates according to Institute of Electrical and Electronics Engineers (IEEE) 1588 protocol.

22. The system of claim 18, wherein the packet synchronization module determines the time and phase information using a packet-based timing scheme according to Institute of Electrical and Electronics Engineers (IEEE) 1588 protocol.

23. The system of claim 18, wherein the slave clock generation module implements a phase locked loop that locks the second clock waveform to the first clock waveform using the time and phase information and the frequency of the first clock waveform.

24. The system of claim 18, further comprising a third node connected to the backplane that generates a third clock waveform, wherein:
- the first node and the third node are master nodes;
- the second node is a slave node; and
- the second node selects between the first clock waveform and the third clock waveform.

* * * * *